United States Patent [19]

Inaba et al.

[11] 3,893,011

[45] July 1, 1975

[54] NUMERICAL CONTROL SYSTEM CONTROLLING A MACHINE AND PROVIDED WITH A SYSTEM FOR COMPENSATING A POSITION-ERROR IN THE NUMERICAL CONTROL OF THE MACHINE

[75] Inventors: Seiuemon Inaba; Kanryo Shimizu, both of Kawasaki; Yoshihiro Hashimoto, Yokohama; Hiroshi Usami, Kawasaki; Youichi Amemiya, Tokyo, all of Japan

[73] Assignee: Fujitsu Ltd., Japan

[22] Filed: Oct. 17, 1973

[21] Appl. No.: 407,286

Related U.S. Application Data

[63] Continuation-in-part of Ser. No. 80,041, Oct. 12, 1970.

[30] Foreign Application Priority Data

Oct. 24, 1969 Japan.............................. 44-85138

[52] U.S. Cl. ................ 318/685; 318/696; 318/573; 318/618; 318/632
[51] Int. Cl. .......................................... G05b 19/40
[58] Field of Search .......... 318/573, 618, 685, 696, 318/632

[56] References Cited

UNITED STATES PATENTS

| | | | |
|---|---|---|---|
| 3,416,056 | 12/1968 | Motooka et al. | 318/573 |
| 3,539,897 | 11/1970 | Sommeria | 318/618 |

*Primary Examiner*—T. E. Lynch
*Attorney, Agent, or Firm*—Robert E. Burns; Emmanuel J. Lobato; Bruce L. Adams

[57] ABSTRACT

A numerical control system for a machine, which system is provided with a system for compensating a position-error in the numerical control of the machine which comprises a simulating circuit means connected to the numerical control device of the control system. The simulating circuit means simulates a velocity-error characteristic between the numerical control device and the machine and issues outputs containing a result of the simulation. The compensation for the position-error is provided by generating compensating pulses based upon detection of the difference between the outputs of the simulating circuit means and the actual quantity of movement of the machine.

5 Claims, 9 Drawing Figures

NUMERICAL CONTROL SYSTEM CONTROLLING A MACHINE AND PROVIDED WITH A SYSTEM FOR COMPENSATING A POSITION-ERROR IN THE NUMERICAL CONTROL OF THE MACHINE

This is a continuation-in-part application of application Ser. No. 80,041, filed Oct. 12, 1970.

The present invention relates to a numerical control system for a machine, which system is provided with a system for compensating a position-error in numerical control of the machine.

In a numerical control system provided with a numerical control device for providing quantity of movement commands to a machine, there has already been proposed an error-compensating system in which the difference between the commanded quantity of movement for the machine and the actual quantity of movement of the machine is detected, and subsequently a compensating signal to compensate the difference is generated and then superposed on the command signal by way of electric circuits or differential mechanisms.

However, by the above already proposed compensating system, correct compensation of the difference cannot be attained, if one or more delay elements are provided between the numerical control device and a controlled object of the machine in the numerical control system. That is, even if the command is supplied by the numerical control device to the servo system within the numerical control system, the controlled object such as, for example, a table or a tool of the machine does not immediately move and only begins to move with given delays. Consequently, in the numerical control system including one or more delay elements, such as a hydraulic motor having a first order delay characteristic, if the controlled object is controlled by applying the above already proposed compensating system so that the difference resulting from the comparison between the commanded quantity of movement and the actual quantity of movement may come to zero, the controlled object still overshoots the commanded position. As a result, although the controlled object may eventually stop at the commanded position, an oscillation phenomenon in the motion of the controlled object must always first be produced since the overshooting of the commanded position is repeated. Therefore, a rapid positioning control of the machine and a precise contouring control are not attained. These are apparent drawbacks of the proposed error-compensating system.

There has also been proposed another error-compensating system in which the delay introduced by said hydraulic motor has been taken into consideration. In this latter error compensating system, comparison between the output of said hydraulic motor and the actual quantity of movement of the controlled object is carried out and subsequently, compensating pulses are produced so that the difference resulting from the above comparison may become zero. Then, said compensating pulses are fed back to an electric stepping motor associated with said hydraulic motor. Thus, as there is no delay element between the hydraulic motor and the controlled object, the problem of delay can be avoided in the positioning control of the machine. However, there is still a drawback such that more than one of high cost detecting devices must be employed in the numerical control system and as a result, the cost of the numerical control system becomes high.

The object of the present invention is to provide a numerical control system for a machine, which system is provided with a system for compensating an error in the numerical control of the machine, and by which control system the above drawbacks can be completely eliminated.

According to the present invention, a numerical control system for a machine is provided with a system for compensating a position-error in the numerical control of the machine which comprises a numerical control device for giving command pulses; an electro-hydraulic stepping motor for generating output torques to move a movable part of the machine in response to said command pulses; means for detecting the actual quantity of movement of the movable part; a simulating circuit means connected to said numerical control device for simulating a velocity-error characteristic between said numerical control device and said machine, and for issueing output pulses containing a result of the simulation; compensating pulse generating means for generating compensating pulses in response to the difference between said actual quantity of movement of said movable part detected by said detecting means and quantities of said output pulses from said simulating circuit means, and; feedback means for carrying out negative feedback of said compensating pulses for said electro-hydraulic stepping motor until said difference becomes zero.

The present invention will be readily understood from the ensuing descriptions of a typical prior art and embodiments of the present invention with reference to the accompanying drawings wherein.

Figure 1:
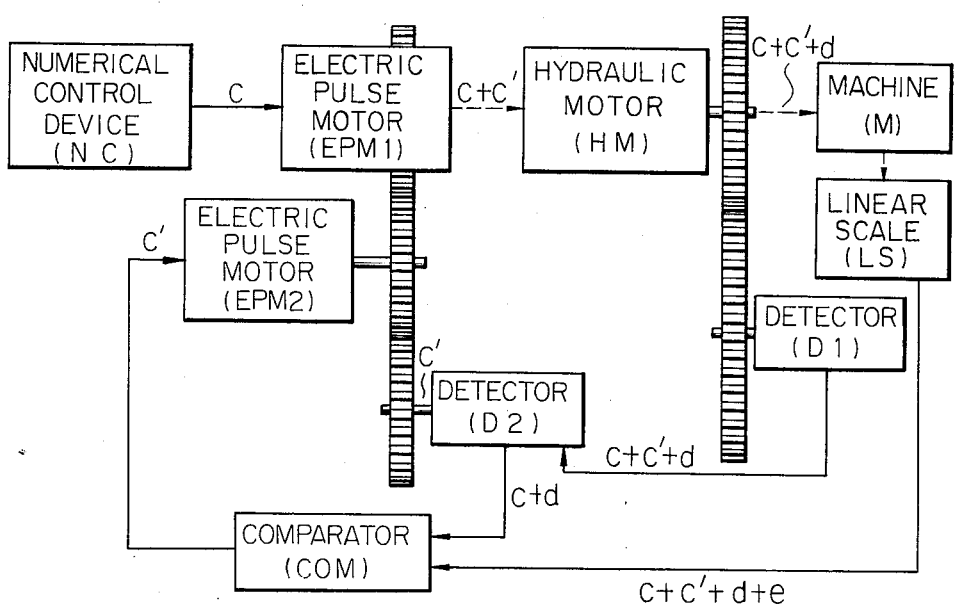
FIG. 1 is a block diagram of a numerical control system for a machine which system is provided with an errorcompensating system according to the typical prior art.

FIG. 1 is a block diagram of a numerical control system for a machine which system is provided with an already proposed error-compensating system which is included in the latter of the two previously described error compensating systems. Referring to FIG. 1, command pulses from the numerical control device NC are supplied to the electric stepping motor EPM1 and rotate the output axis of the motor. The output axis of the electric pulse motor EPM1 is connected to the hydraulic motor HM, so that the output torque of the electric stepping motor EPM1 is amplified, that is, the electric stepping motor EPM1 and the hydraulic motor HM compose a known electro-hydraulic stepping motor. The machine M is moved by the amplified output of the hydraulic motor HM by way of the feed mechanism of the machine. The scope of the art explained up till now, is coincidental with the known art of an open-loop numerical control system. For the elements of the error-compensating apparatus, there are provided with a linear scale LS which detects the actual moving quantity of the machine, a detector D1 which detects the quantity of the rotation of the output axis of the hydraulic motor, a compensating electric stepping motor EPM2, a detector D2 which detects the difference between the rotation of the motor EPM2 and that of the hydraulic motor HM, and a comparator COM which compares the detected quantity of the detector D2 with that of the above-mentioned linear scale.

By applying the above elements, the compensating performance is carried out in the manner described below.

The positive or negative compensating pulses are generated depending upon whether the above compared result is plus or minus, and then the above-mentioned compensating stepping motor EPM2 is brought into rotation by the compensating pulses. The rotation of the motor EPM2 rotates the housing of the electric stepping motor EPM1, which forms a portion of the electro-hydraulic pulse motor, by way of a gear train. Consequently, the output axis of the motor EPM1 rotates an amount corresponding to the quantity to be compensated to make the required compensation of an error.

Now, assuming that $c$, $c'$, $d$ and $e$ are the command quantity, the compensated quantity, the delay quantity by the electro-hydraulic pulse motor, and the error of the feed mechanism of the machine or the like, respectively, the corresponding signals transmitted are shown in FIG. 1 and the compensating pulses are issued so that $c'$ and $e$ equal zero. But in the above-known system, since resolvers are used for detectors D1 and D2 and since the detector D1 detects the output of the hydraulic motor, the indexing errors of the detectors D1 and D2 themselves decrease the accuracy of the whole of the system. Further, such resolvers used for detectors D1 and D2, are not only very costly but also, are very difficult to assemble on the machine and to adjust because they are mounted on the machine together with the gear trains as shown in FIG. 1.

It will now be understood that the numerical control system of FIG. 1, provided with an already proposed error-compensating system, lacks simplicity and low manufacturing cost.

Figure 2:
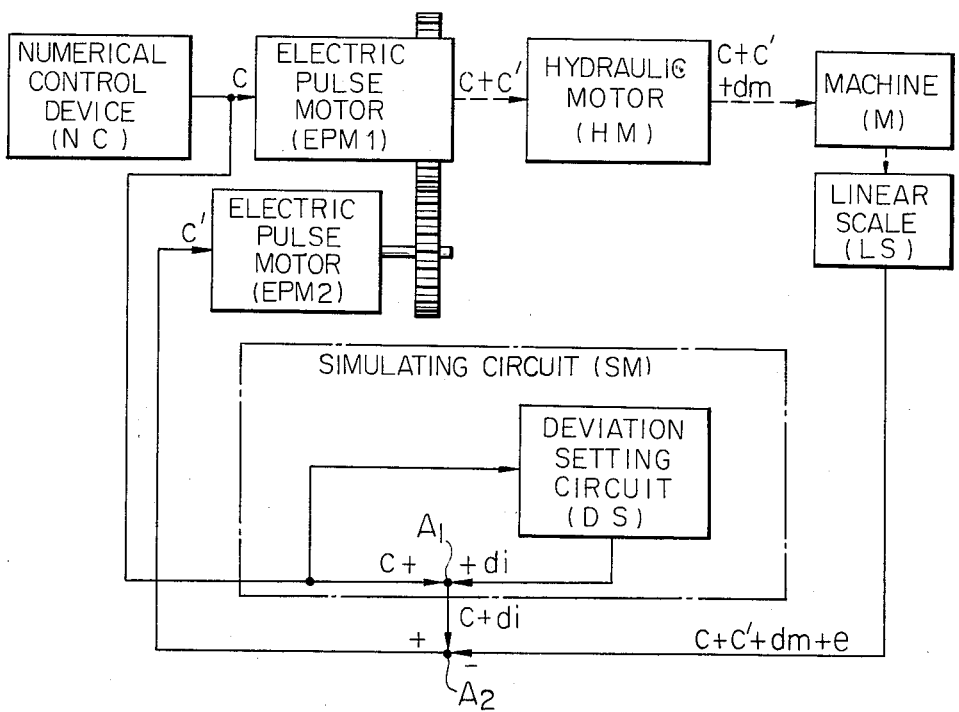
FIG. 2 is a block diagram of a numerical control system for a machine which system is provided with a system for compensating an error in the numerical control of the machine according to an embodiment of the present invention.

FIG. 2, which is a block diagram of a numerical control system in accordance with the present invention, indicates that the compensation of an error is carried out by rotating the housing of electric stepping motor EPM1 with the compensating electric stepping motor EPM2, the same as in the above description. But the detection of the driving quantity for the machine is carried out by making use of the command pulses directly from the numerical control device without using detectors.

In FIG. 2, the signals $c$, $di$, $dm$, and $e$ indicate the command pulses, the ideal steady-state deviation of the whole system, the steady-state deviation of electro-hydraulic pulse motor, and the errors of the mechanical systems (pitch error, backlashes, elastic defomration and the like), respectively.

It should now be noted that in accordance with the present invention a simulating circuit SM, as indicated in FIG. 2, by the block shown by a phantom line, produces the signal $(c + di)$. That is, the deviation $di$ proportional to the frequency of command pulses $c$ is produced by a deviation setting circuit DS and summed up with the pulses $c$ at the summing point A1. Subsequently, the actual moving quantity $(c + c' + dm + e)$ of the machine M is subtracted from the resultant $(c + di)$ at the summary point A2. Then, positive or negative compensating pulses are obtained depending upon whether the resultant total is positive or negative, that is, the compensating pulses $c'$ are supplied so that the total, $di - (c' + dm + e)$, always becomes zero.

Normally, an electro-hydraulic stepping motor has a first order delay characteristic. As is broadly known assuming that an input pulse velocity for the motor equals Fi, the value in an output pulse velocity to which the rotational speed of the electro-hydraulic stepping motor is converted equals Fo, and a gain of the electro-hydraulic stepping motor equals k, the following equation can be defined.

$$Fo = Fi[1 - exp(-kt)] \tag{1}$$

Also, when the rotational quantity of the motor is converted into a pulse quantity, the difference E between an input pulse quantity and an output pulse quantity can be defined by the following equation.

$$E = \frac{Fi}{k}[1 - exp(-kt)] \tag{2}$$

Therefore, from the above two equations (1) and (2), the following equation can be provided.

$$E = Fo/k \tag{3}$$

As the above difference $E$ corresponds to $dm$ shown in FIG. 2, it is shown from the above equation (3) that the difference $E$ is proportional to the pulse velocity $Fo$.

Considering the above equation (3), it is apparent that a highly accurate continuous path control can be accomplished if di is set to vary linearly in relation to the output velocity Fo so that the steady-state deviation dm is controlled to always maintain an ideal setting value di in the whole control system including the mechanical system. The shown linear scale LS can be anyone of a linear inductosyn, a magnescale or a Moire fringe device; of which the first two detect a mechanical deviation as electrical phase shift, while the latter detects it as pulse signals. Consequently, when the pulses should be applied at the summing point A2, the electrical phase shift signals are transformed into rows of pulses, the number of which being proportional to the phase shift in accordance with the known A-D converting method at the point A2.

Figure 3:
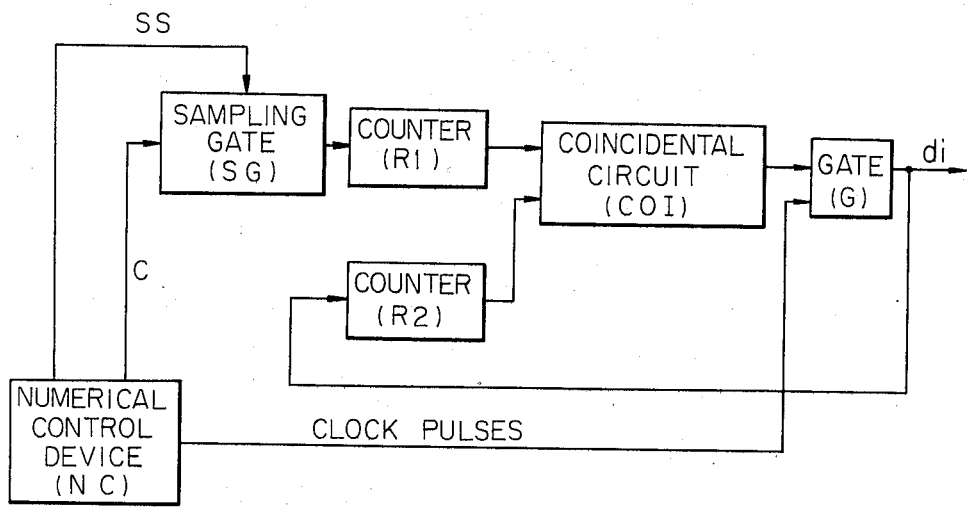
FIG. 3 is an explanatory diagram illustrating a deviation setting circuit according to an embodiment of the present invention.

FIG. 3 shows an embodiment of a deviation setting circuit which sets deviation $di$ in proportion to the command velocity, that is, the frequency of the command pulses. This circuit comprises two counters R1 and R2, a sampling gate SG, a coincidental circuit COI and a gate G. A sampling signal SS, coming from the numerical control device NC opens the sampling gate SG for a predetermined period T1 and makes the counter R1 count the command pulses C. After the completion of the above counting by the counter R1, the clock pulses from the numerical control device are issued to produce the deviation pulses $di$ through the gate G, until the content of the counter R2 is equalized to the content of the counter R1. As soon as the contents of the counter R1 and R2 are equalized, the gate G closes in company with resetting the counters in accordance with the signal from the coincidental circuit COI and performances similar to the above description are repeated again. Thus, the number of output pulses through the gate G is made to be accurately proportional to the velocity of the command pulses that is, the frequency of the command pulses.

Additionally, although at the moment the operation of the electro-hydraulic stepping motor starts the velocity of the command pulses for the motor is different from the output pulse velocity of the motor, the two velocities become immediately equal as is understood from the above-mentioned equation (1). Consequently, the deviation $di$ is also proportional to the above output velocity and thus, this deviation $di$ can be a correct steady-state deviation of the whole control system.

Figure 4:
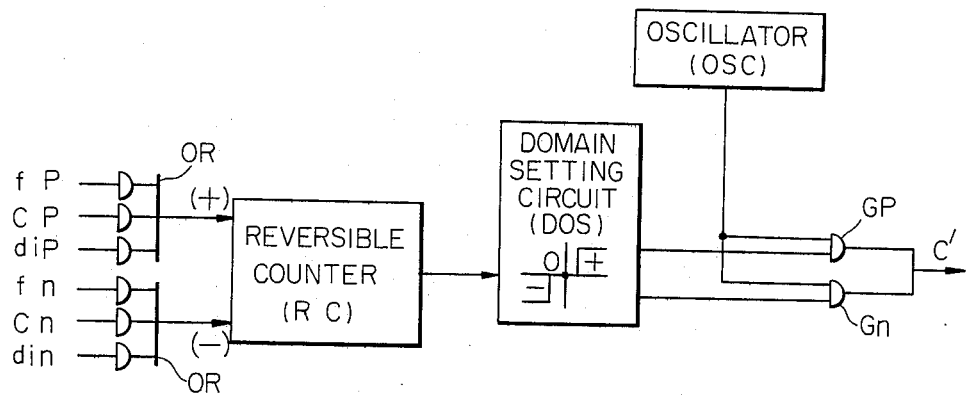
FIG. 4 is a detailed explanatory diagram of a compensating pulse generating circuit according to the present invention.

FIG. 4 is a detailed block diagram of the compensating pulse generating section. In the drawing, $fp$, $cp$ and $dip$ show the feedback positive pulses in accordance with the detection by the linear scale, the command positive pulses and the deviation positive pulses, respectively. On the other hand, $fn$, $cn$ and $din$ show the feedback negative pulses, the command negative pulse and the deviation negative pulses, respectively.

When the machine is moved toward the positive direction, the command positive pulses Cp are given and added to the reversible counter RC. At the same time, deviations negative pulses $din$ and feedback negative pulses $fn$ are also given to the subtracting terminal of the reversible counter RC. Consequently, in the reversible counter RC, the value corresponding to the above-mentioned $di - (c' + dm + e)$ is stored.

Then, the content of the counter RC is discriminated as to whether it is a positive, zero or negative value in the domain setting circuit DOS. If it is positive the gate Gp is opened, if it is negative the gate Gn is opened and if it is zero both gates are closed.

When one of the gates Gp and Gn is opened, the pulses emitted from the oscillator OSC are obtained as the compensating pulses.

In the above-described embodiment, as soon as the command pulses come to an end, the deviation $di$ accurately becomes zero. Consequently, the signals of the linear scale arrive to be compared directly with the total of command signals given by the numerical control device Nc and, therefore, the final positioning accuracy of the whole system depends upon the single accuracy of the linear scale LS.

In the above-mentioned embodiment, the compensation of an error is performed by driving the compensating electric pulse motor EPM2 by the compensating pulse $c'$, but the electric pulse motor EPM1 may be rotated directly by the compensating pulses $c'$. This embodiment is shown in FIG. 5.

Figure 5:
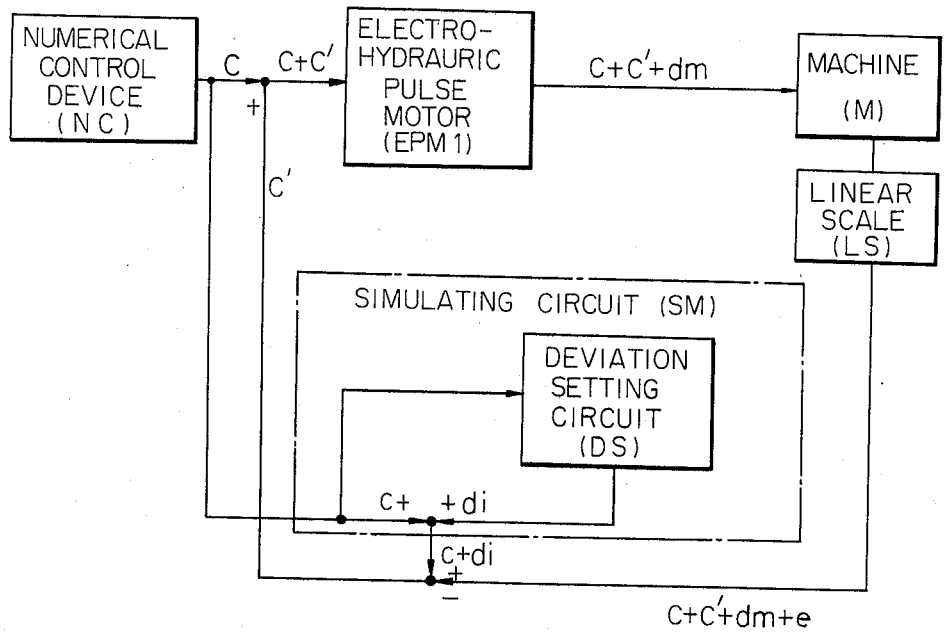
FIG. 5 is a block diagram of a numerical control system for a machine which system is provided with a system for compensating an error in the numerical control of the machine according to another embodiment of the present invention.
Figure 6:
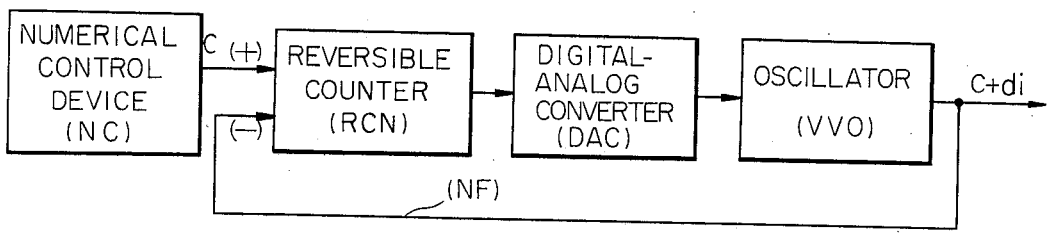
FIG. 6 is an explanatory circuit diagram illustrating an embodiment of the simulating circuit shown in FIG. 2 and FIG. 5 without the deviation setting circuit.

FIG. 6 is an embodiment of the simulating circuit SM shown in FIG. 2 and FIG. 5 without the deviation setting circuit DS. The simulating circuit comprises: a reversible counter RCN for counting command pulses from the numerical control device NC so as to increase the content of the counter RCN; a digital-analogue converter DAC for generating an output analogue voltage proportional to said content of the counter RCN; a variable voltage oscillator VVO for generating pulses oscillating at a frequency proportional to said output voltage of the digital-analogue converter, and; a feedback circuit NF for carrying out negative feedback of said output pulses of the oscillator to the subtracting terminal of the reversible counter RCN.

The input to output characteristic of this simulating circuit will hereinafter be analyzed.

If it is supposed that a pulse velocity of command pulses C from the numerical control device NC equals Fi, the content of the reversible counter RCN equals E, and a pulse velocity of the output pulses $(c + di)$ from the oscillator OSC equals Fo, the increase of the content E of the reversible counter RCN per a unit time $dE/dt$ can be defined as follows.

$$dE/dt = Fi - Fo \tag{4}$$

As the pulse velocity Fo is proportional to the content E of the reversible counter RCN, the following equation can be established.

$$Fo = k'E \tag{5}$$

In this equation (5), $k'$ defines a proportion factor or a gain.

If the equation (5) is introduced in the equation (4), E is obtained by the following equation.

$$E = Fi/k'[1 - exp(-k't)] \tag{6}$$

Therefore, $$Fo = Fi[1 - exp(-k't)] \tag{7}$$

When both equations (6) and (7) are compared with the previous equations (2) and (3), it will be understood that the equations (6) and (7) are the same as the equations (2) and (3) if $k' = k$ is established. It should be noted that the content E of the reversible counter RCN is established to be a deviation.

Figure 7:
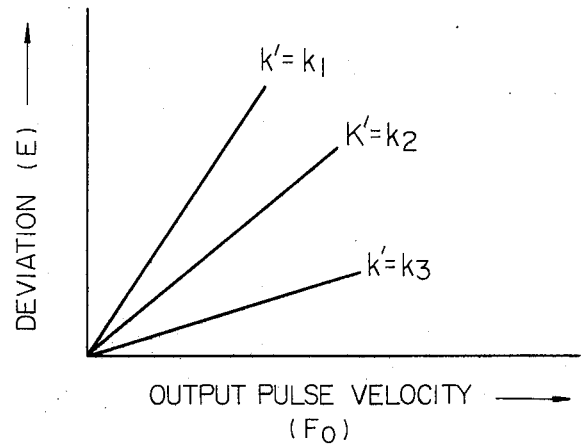
FIG. 7 is a graph illustrating a relation between the deviation simulated by a simulating circuit of the present invention and the output pulse velocity from the simulating circuit with respect to various gains of the circuit.

FIG. 7 is a diagram illustrating changes of the relation between the deviation E and the output pulse velocity Fo with respect to various gains $k'$. Thus, if the value of the gain $k'$ is set so as to be equal to the electrohydraulic stepping motor, the simulating circuit SM of FIG. 6 completely simulates the velocity-error characteristic of the electro-hydraulic stepping motor. Hence, it will be understood that if the output of the simulating circuit is compared with the actual movement of the controlled object and, if compensating pulses are generated which render the difference resulting from the comparison null and, further, if the compensating pulses are given back to the electro-hydraulic stepping motor EPM1 of FIG. 5 or the electric stepping motor EPM2 of FIG. 2, the problems of the velocity error and the necessity for many expensive detectors can be solved.

Figure 8:
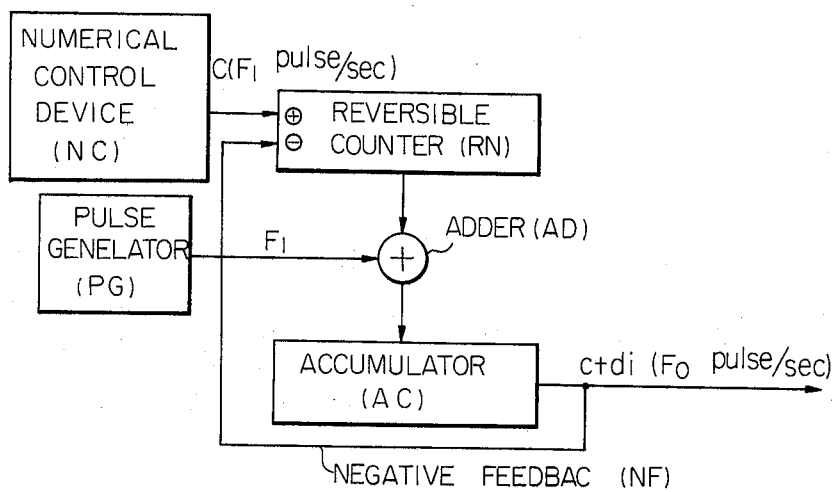
FIG. 8 is a circuit diagram illustrating another embodiment of the simulating circuit shown in FIG. 2 and FIG. 5 without the deviation setting circuit.

FIG. 8 is an another embodiment of the simulating circuit without the setting deviation circuit.

Contrary to the fact that the previous embodiment of FIG. 6 is constituted as an analogue circuit means, this embodiment of FIG. 8 is constituted as a pure digital circuit. The simulating circuit of FIG. 8 comprises: a reversible counter RN for counting command pulses C from the numerical control device NC so as to increase the content of the reversible counter RN; a pulse generator PG for generating pulses of a constant frequency F1; an accumulator AC having a preselected number of bits, for example, n bits; an adder ADD which adds the content of the reversible counter RN to the content of the accumulator AC every time the adder receives a pulse from said pulse generator PG and stores the resultant sum in accumulator AC, and; a feedback circuit NF which carries out a negative feedback of overflow pulses generated as output pulses $(c + di)$ from the n bits-accumulator AC, to the subtracting terminal of said reversible counter RN.

If it is supposed that the content of the reversible counter RN equals E, the content of the accumulator AC equals A, the command pulse velocity equals Fi, and the output pulse velocity equals Fo, an analysis of this simulating circuit of FIG. 8 can be as follows.

$$dE/dt = Fi - Fo \quad (8)$$

$$dA/dt = Fi \cdot E \quad (9)$$

$$Fo = (dA/dt)\cdot(\tfrac{1}{2^n}) = Fi \cdot E/2^n = k'' \cdot E \quad (10)$$

$$k'' = Fi/2^n \quad (11)$$

From the above equations (8) and (10), the following equations are provided.

$$E = Fi/k''[1 - exp(-k''t)] \quad (12)$$

$$Fo = Fi[1 - exp(-k''t)] \quad (13)$$

Now, considering the above equations (12) and (13), it will be understood that this simulating circuit is provided with the same characteristic as the simulating circuit of FIG. 6.

Figure 9:
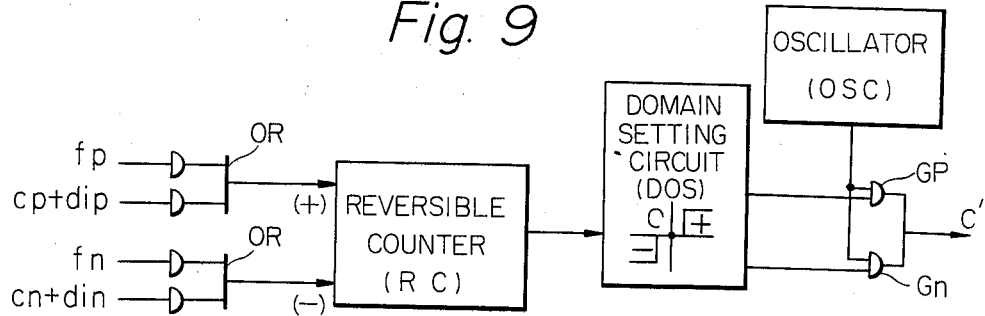
FIG. 9 is an explanatory diagram of an improvement of the compensating pulse generating circuit shown in FIG. 4.

FIG. 9 is a detailed circuit diagram of the compensating pulse generating portion according to the present invention in the case that the embodiments of FIGS. 6 and 8 are used as the simulating circuit.

In FIG. 9, fp indicates feedback positive pulses resulting from the detection by the linear scale LS of FIG. 2, or FIG. 5, cp indicates the command positive pulses, and dip shows the deviation positive pulses. It should, however, be noted that with respect to the command positive pulses cp and the deviation positive pulses dip, they are transmitted from the output terminal of the simulating circuit SM of FIG. 6 or FIG. 8 in the form of the added pulses $(Cp + dip)$.

On the other hand, fn, cn and din indicate feedback negative pulses, the command negative pulses, and the deviation negative pulses, respectively. In this case also, the added pulses $(Cn + din)$ are transmitted from the output terminal of the simulating circuit SM.

In the numerical control system of the present invention, when the machine, that is, a movable part of the machine, is moved toward a predetermined positive direction, the command positive pulses $Cp$ are transmitted from the numerical control device and added to the reversible counter RCN or RN in the simulating circuit of FIG. 6 or 8. Then, the pulses $(Cp + dip)$ are obtained from the output terminal of the simulating circuit. The output pulses $(Cp + dip)$ of the simulating circuit are transmitted to the summing input terminal of the reversible counter RC in the compensating pulse generating portion, and at this time the feedback negative pulses fn are simultaneously transmitted to the subtracting terminal of the reversible counter RC. Consequently, in the reversible counter RC, the content of the value corresponding to the $di - (c' + dm + e)$ is stored. Then, this content of the reversible counter RC is transmitted to a domain setting circuit DOS and undergoes discrimination as to whether it is positive, zero, or negative by the domain setting circuit DOS. If the content is positive a gate Gp is opened, if the content is negative a gate Gn is opened and if the content is zero both gates Gp and Gn are closed. When either the gate Gp or Gn opens, an oscillator OSC emits pulses as the compensating pulses.

It will be understood that in accordance with the present invention, a highly accurate compensation of a position-error in the numerical control of a machine, can be attained with a relatively low cost arrangement. It will also be understood that a highly accurate continuous path control of a machine can be attained since the deviations of the mechanical system as well as the servo system are always kept to the ideal deviations of the whole numerical control system.

What is claimed is:

1. A position-error compensated numerical control system for a controlled member of a machine, which comprises:

a numerical control device for developing command pulses;

an electro-hydraulic stepping motor responsive to said command pulses for developing torques to position the controlled member of the machine in response to said command pulses;

means for measuring the amount of movement of the controlled member;

simulating circuit means connected to said numerical control device and receptive of said command pulses for developing output pulses simulating a lag error which causes a delay between the development of said command pulses by said numerical control device and the resultant movement of the controlled member;

compensating pulse generating means cooperative with said measuring means and said numerical control device for generating compensating pulses representative of the difference between the measured amount of movement of the controlled member measured by said measuring means and an amount of movement represented by the output pulses developed by said simulating circuit means; and feedback means receptive of said compensating pulses and cooperative with said electrohydraulic stepping motor for reducing said difference to zero.

2. A numerical control system as claimed in claim 1, wherein said simulating circuit means comprises a sampling gate receptive of the command pulses and periodically enabled to pass the command pulses, a first counter for counting said command pulses during a period of time said sampling gate is enabled, a second counter for counting external clock pulses during a period of time said sampling gate is disabled until the content thereof is equal to that of said first counter, a gate for passing said external clock pulses to provide deviation pulses after completion of counting of said command pulses by said first counter, a coincidental circuit for developing a signal to close said gate when said contents of said first and said second counters are equal, and an adder for adding said deviation pulses to said command pulses.

3. A numerical control system as claimed in claim 1, wherein said simulating circuit means comprises: a reversible counter for counting said command pulses developed by said numerical control device so as to increase the content of said reversible counter; a digital-analogue converter for producing an analogue voltage proportional to the magnitude of said content of said counter; pulse generating means for generating pulses at a frequency proportional to said analogue voltage, and; feedback means for applying said pulses generated by said pulse generating means to said reversible counter to decrease the content thereof.

4. A numerical control system as claimed in claim 1, wherein said simulating circuit means comprises: a reversible counter for counting said command pulses from said numerical control device so as to increase the content thereof; a pulse generator for generating pulses at a constant frequency; an accumulator having a predetermined members of bits; an adder device receptive of pulses developed by said pulse generator for adding said content of said reversible counter to the content stored in said accumulator every time said adder receives one of said pulses from said pulse generator and for storing the result of said addition in said accumulator, and; feedback means for applying overflow pulses, generated by said accumulator, to said reversible counter to reduce the content thereof, said overflow pulses being provided as output pulses of said simulating circuit means.

5. A numerical control system as claimed in claim 1, wherein said compensating pulse generating means comprises: a reversible counter having summing and subtracting inputs receptive of the pulses developed by said simulating circuit means and said detecting means thereby to reversibly count the output pulses of said simulating circuit means and pulses corresponding to the amount of movement of the controlled member; means for discriminating the content of said reversible counter as to whether the content is positive, zero or negative; an oscillator device for generating pulses at a constant frequency, and; gate means cooperative with said oscillator and discriminating means for passing said pulses from said oscillator in response to the determination of said discriminating means so that said pulses passing said gate means are said compensating pulses.

* * * * *